Sept. 23, 1952     I. A. KERNKAMP     2,611,622
OXYGEN TANK CART
Filed July 28, 1950
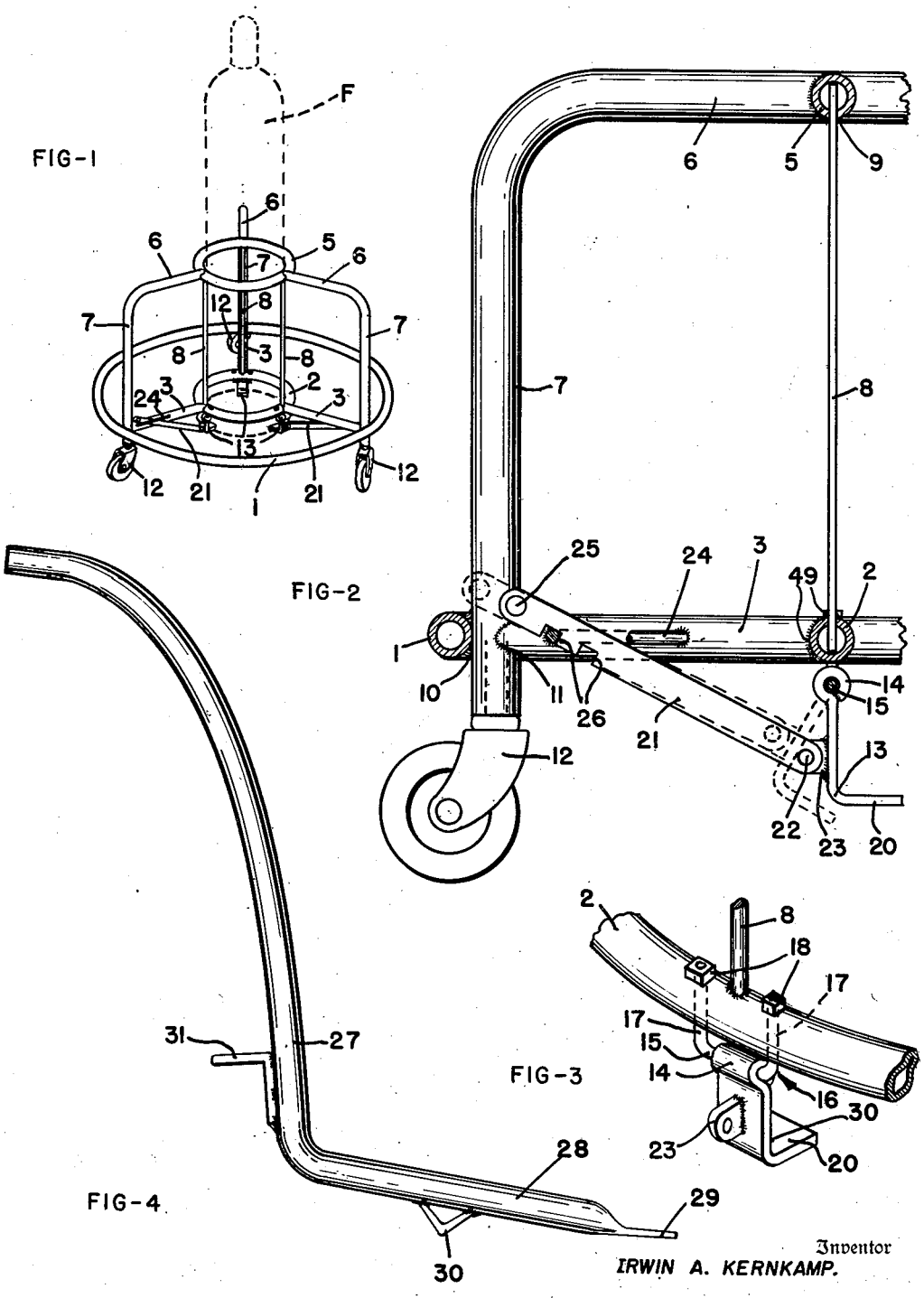
Inventor
IRWIN A. KERNKAMP.
By
Glenn L. Fish
Attorney Patented Sept. 23, 1952

2,611,622

UNITED STATES PATENT OFFICE 2,611,622

OXYGEN TANK CART

Irwin A. Kernkamp, Spokane, Wash.

Application July 28, 1950, Serial No. 176,366

2 Claims. (Cl. 280—5)

This invention relates to an oxygen tank cart and it is one object of the invention to provide a device of this character by means of which a heavy oxygen tank may be supported in a raised position out of contact with a floor and readily transported from one place to another in a hospital or in a doctor's office.

Another object of the invention is to so form the cart that it may be lowered into place about a cylindrical tank resting in a vertical position upon a floor and hooks carried by the cart moved into position to engage under the bottom of the tank and support the tank in a raised position allowing the cart and the tank to be pushed along a floor from one location to another.

Another object of the invention is to provide a cart wherein a lower tank-encircling ring is carried by bars extending between this ring and a main ring of the frame, there being also an upper tank-encircling ring which is carried by struts secured in a vertical position upon the main ring, the upper ring being braced by rods extending vertically between it and the lower ring.

Another object of the invention is to provide a cart having castors which are mounted at lower ends of the struts so that the cart may be very easily pushed along a floor.

Another object of the invention is to provide a cart having practically all of its elements formed of metal tubing and thus provide a cart which is of light weight but very strong.

The invention is illustrated in the accompanying drawings wherein:

Fig. 1 is a perspective view of the oxygen tank cart.

Fig. 2 is a view upon an enlarged scale showing a portion of the cart in vertical section.

Fig. 3 is a fragmentary perspective view showing the manner in which the tank-supporting hooks are formed and mounted.

Fig. 4 is a side elevation of a lever used for raising the tank to a position in which the hooks may be engaged under the bottom of the tank.

This improved tank cart is primarily intended for transporting heavy cylindrical tanks in which oxygen is stored under pressure but it may be used as a carrier for holding and transporting other heavy containers, pipe sections, or other articles of such formation that they may be set upon a floor in an upright position and the cart held over the said article and then lowered into place about the article.

The frame of the cart has a large outer ring 1 which is formed of tubing, as shown in Figure 2, so that it will be strong but of light weight. Centric with the outer ring is a small inner ring 2, which is also formed of metal tubing, and this inner ring is supported by bars 3 which extend radially of the two rings and have their inner ends welded to the inner ring, as shown at 4 in Figure 2. An upper ring 5 which is of the same diameter as the lower ring 2 is disposed directly over the lower ring, and to this upper ring are welded ends of the inwardly bent radial upper portions or arms 6 of vertically disposed struts or legs 7, also formed of metal tubes. Rods 8 extend vertically between the upper and lower rings and have their upper and lower end portions passed through openings formed in the rings and welded, as shown at 9 so that they will be firmly secured to the rings. Lower end portions of the struts or legs 7 extend downwardly through the large ring 1 and are welded to this ring, as shown at 10, and outer ends of the bars 3 are recessed so that they may be disposed in close fitting engagement with the struts and welded thereto, as shown at 11 in Figure 2. It will thus be seen that the frame of the cart will be strong but formed of metal of such light weight that the frame may be easily lifted and held in a horizontal position over the upper end of an oxygen tank F and then lowered to a position in which the tank extends vertically through the two rings 2 and 5. The struts extend below the outer ring 1 a short distance and as they are hollow their lower ends form sockets in which are fitted castors 12 which allow the cart to be easily pushed along a floor from one place to another.

A tank about which the cart is disposed is to be supported in an elevated position out of contact with the floor. In order to do so there have been provided hooks 13 which are formed from strips of stiff metal. These hooks have their upper ends formed with sleeves or transversely extending eyes 14 through which pass the bridge portions 15 of hangers 16. The arms 17 of the hangers or brackets 16 are passed upwardly through openings formed in the inner ring 2 and nuts 18 which are applied to threaded upper ends of the arms hold the hangers to the ring. The bridge portions of the hangers extend circumferentially of the end therefore the hooks are mounted for pivotal movement radially of the ring. The hooks must be swung outwardly from the normal position shown in full lines in Figure 2 to the position indicated by dotted lines in order that the inwardly extending bills 20 may be engaged under the bottom of the tank, and in order that this may be done each hook is provided with a handle bar or link 21 which has its inner end pivoted by a pin 22 to an ear 23 projecting outwardly from the hook. The bars 21 extend at an upward incline from the hooks and each slidably passes through a bracket or keeper 24 carried by the adjoining supporting bars or braces 3. Outer ends of the links are provided with handles 25 in order that they may be readily grasped and pull exerted to swing the hooks outwardly and lower edge portions of the handles are formed with longitudinally spaced notches 26 into which arms at ends of the U-shaped keepers engage so that the hooks will be held in against inward movement when swung outwardly to an inoperative position.

After the cart has been disposed about the tank and the hooks secured in their outwardly swung inoperative position the tank must be lifted and thus allow the bills of the hooks to be engaged under the tank. In order to do so a lever is used. Such a lever is illustrated in Figure 4, and referring to this figure it will be seen that the lever is formed from a pipe or tube which is bent in spaced relation to its lower end to form a forwardly projecting arm or foot 28 terminating in a flattened toe or bill 29. A V-shaped piece of metal forming a fulcrum 30 is welded to the under surface of the foot midway the length thereof and to the rear surface of the lower portion of the lever is welded a bracket or stirrup 31. It will thus be seen that after the cart is in place about a tank it may be lifted slightly to move a portion of its bottom out of contact with the floor adjacent one of the bars 3 and the bill 29 of the lever then thrust under the raised portion of the tank and pressure then applied to the stirrup by a foot in order to hold the bill under the tank while the upper or rear end of the lever is swung downwardly to rock the lever upon its fulcrum and raise the tank a sufficient distance to allow the bills 20 of the hooks to engage under the tank. Engagement of the hooks under the tank is accomplished by swinging the handles 21 of the hooks a sufficient distance to free the handles from the arms of the keepers 24 and the handles will then slide longitudinally to a position in which the bills of the hooks are disposed under the tank and the keepers engaged in the outer notch of the handles, as shown in Figure 2, instead of the inner notch. This will hold the hooks under the tank and prevent it from slipping out of supporting engagement with the tank. The cart may then be pushed along the floor and moved from one place to another. When the tank is empty it is merely necessary to again apply upward pressure to the bottom of the tank to free the tank from the hooks and the hooks may be swung upwardly and secured in an inoperative position while the tank is being lowered onto the floor. The cart is then raised to a position in which it is disposed above the upper end of the tank and shifted transversely to a position in which it may be set at rest upon the floor and put away until again needed.

Having thus described the invention, what is claimed is:

1. A cart for a cylindrical tank comprising a carriage adapted to be lowered over a tank and having a base formed of inner and outer rings, bars holding said rings concentric with each other, a vertically spaced ring above said inner ring and carried by the base for bracing a tank against tilting movement above the base, wheels under the base, hooks pivotally connected with and extending downwardly from the inner ring in spaced relation to each other circumferentially thereof, bills on the hooks adapted to swing into and out of supporting engagement with a tank, links pivoted to said hooks for vertical tilting movement and extending outwardly from the hooks, keepers on said bars through which links of the hooks pass upwardly at an incline, and notches in the links into which portions of said keepers removably fit and releasably hold the hooks in or out of supporting engagement with a tank.

2. A cart for a cylindrical tank comprising a base adapted to be lowered over a tank and formed of inner and outer rings, bars holding said rings concentric with each other, an upper ring spaced above said inner ring, tubes secured to said upper ring and extending radially therefrom, said tubes being bent downwardly in spaced relation to said upper ring to form legs, said legs extending downwardly within said outer ring and terminating in sockets positioned below said outer ring and being welded to said outer ring, castors in said sockets, vertical bracing rods secured between said inner and upper rings and spaced from each other circumferentially thereof, and supporting means carried by the inner ring and movable into and out of position to engage under the bottom of a tank disposed vertically through the inner and upper rings and adapted to support the tank in elevated position or be positioned in the inoperative position and permit the cart to be lifted or lowered over the tank.

IRWIN A. KERNKAMP.

REFERENCES CITED

The following references are of record in the file of this patent:

UNITED STATES PATENTS

| Number | Name | Date |
| --- | --- | --- |
| 1,063,620 | Thornby | June 3, 1913 |
| 2,316,938 | Dimick | Apr. 20, 1943 |
| 2,396,368 | Gorrell et al. | Mar. 12, 1946 |
| 2,509,240 | Meehan | May 30, 1950 |
| 2,570,504 | Van House | Oct. 9, 1951 |

FOREIGN PATENTS

| Number | Country | Date |
| --- | --- | --- |
| 561,907 | Germany | Oct. 20, 1932 |
| 61,138 | Norway | July 17, 1939 |